(12) United States Patent
Chitrapu

(10) Patent No.: US 9,083,436 B2
(45) Date of Patent: Jul. 14, 2015

(54) FULL DUPLEX COMMUNICATION SYSTEM USING DISJOINT SPECTRAL BLOCKS

(75) Inventor: Prabhakar R. Chitrapu, Blue Bell, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 989 days.

(21) Appl. No.: 11/072,703

(22) Filed: Mar. 4, 2005

(65) Prior Publication Data

US 2005/0195758 A1    Sep. 8, 2005

Related U.S. Application Data

(60) Provisional application No. 60/550,492, filed on Mar. 5, 2004.

(51) Int. Cl.
*H04J 1/08* (2006.01)
*H04B 7/26* (2006.01)

(52) U.S. Cl.
CPC ............ *H04B 7/2615* (2013.01); *H04B 7/2618* (2013.01)

(58) Field of Classification Search
USPC ......... 370/329, 342, 444, 485, 208, 320, 335, 370/360, 436, 478, 276–281; 455/452.1, 455/450, 419, 435; 375/131
See application file for complete search history.

(56) References Cited

U.S. PATENT DOCUMENTS

| | | | |
|---|---|---|---|
| 5,260,968 A | 11/1993 | Gardner et al. | |
| 5,548,809 A * | 8/1996 | Lemson | 455/454 |
| 5,570,350 A * | 10/1996 | Myer et al. | 370/335 |
| 6,128,276 A * | 10/2000 | Agee | 370/208 |
| 6,334,057 B1 * | 12/2001 | Malmgren et al. | 455/450 |
| 6,504,840 B1 * | 1/2003 | Bostrom et al. | 370/360 |
| 6,553,534 B2 * | 4/2003 | Yonge et al. | 714/774 |
| 6,560,209 B1 | 5/2003 | Alamouti et al. | |
| 6,591,109 B2 * | 7/2003 | Pan | 455/452.1 |
| 6,597,671 B1 * | 7/2003 | Ahmadi et al. | 370/329 |
| 6,889,182 B2 * | 5/2005 | Gustafsson | 704/205 |
| 7,020,165 B2 * | 3/2006 | Rakib et al. | 370/485 |
| 7,035,310 B1 * | 4/2006 | Roberts | 375/132 |
| 7,113,777 B2 * | 9/2006 | Farber et al. | 455/426.1 |
| RE41,178 E * | 3/2010 | Ahmavaara | 370/337 |
| 2002/0001336 A1 * | 1/2002 | Hosomi | 375/130 |
| 2002/0159426 A1 * | 10/2002 | Kanemoto et al. | 370/342 |
| 2002/0167961 A1 * | 11/2002 | Haartsen | 370/444 |
| 2002/0172163 A1 * | 11/2002 | Chen et al. | 370/281 |
| 2002/0197984 A1 * | 12/2002 | Monin et al. | 455/419 |
| 2004/0013101 A1 * | 1/2004 | Akin et al. | 370/342 |
| 2005/0041619 A1 * | 2/2005 | Karabinis et al. | 370/329 |
| 2005/0176458 A1 * | 8/2005 | Shklarsky et al. | 455/523 |

(Continued)

OTHER PUBLICATIONS

Federal Communications Commission, "FCC Takes Steps to Allocate Additional Spectrum for New Wireless Services," (Nov. 20, 2000).

*Primary Examiner* — Alex Skripnikov
(74) *Attorney, Agent, or Firm* — Volpe and Koenig, P.C.

(57) ABSTRACT

The invention involves utilizing pieces of disjoint spectral blocks. In one embodiment, a frequency division duplex approach is used, where each spectral block is utilized solely for either uplink or downlink communications. In another embodiment, a time division duplex approach is used, where each spectral block is time divided and uplink and downlink communications are assigned to different time slots within the same spectral blocks. In another embodiment, a code division duplex approach is utilized, where uplink and downlink communications are assigned different codes/hopping patterns within a same spectral block.

16 Claims, 2 Drawing Sheets

(56) References Cited

U.S. PATENT DOCUMENTS

| | | |
|---|---|---|
| 2005/0215251 A1* | 9/2005 | Krishnan et al. .............. 455/434 |
| 2006/0120473 A1* | 6/2006 | Baum ........................... 375/260 |
| 2006/0126493 A1* | 6/2006 | Hashem et al. ............... 370/208 |
| 2008/0031179 A1* | 2/2008 | Gao et al. ...................... 370/312 |
| 2008/0285670 A1* | 11/2008 | Walton et al. ................. 375/260 |
| 2009/0252200 A1* | 10/2009 | Dohler et al. ................. 375/141 |

* cited by examiner

FIG. 1A
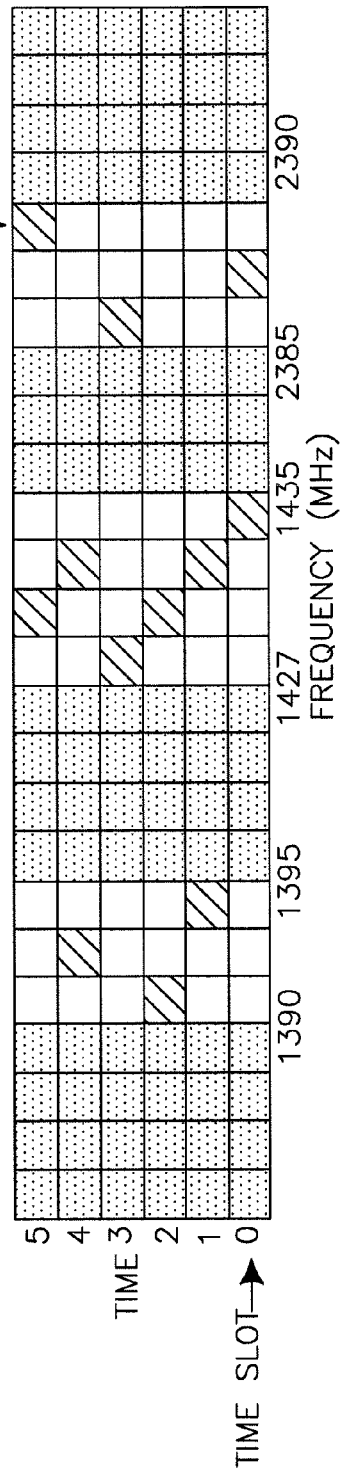
FIG. 1B
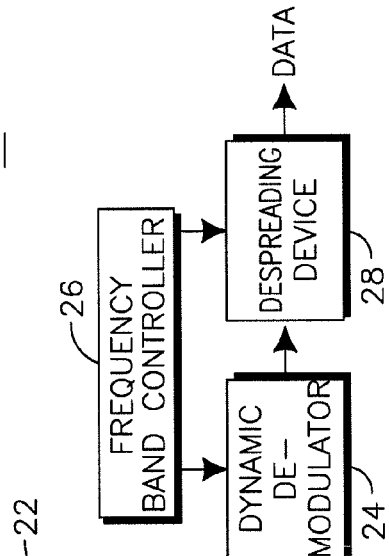
FIG. 2
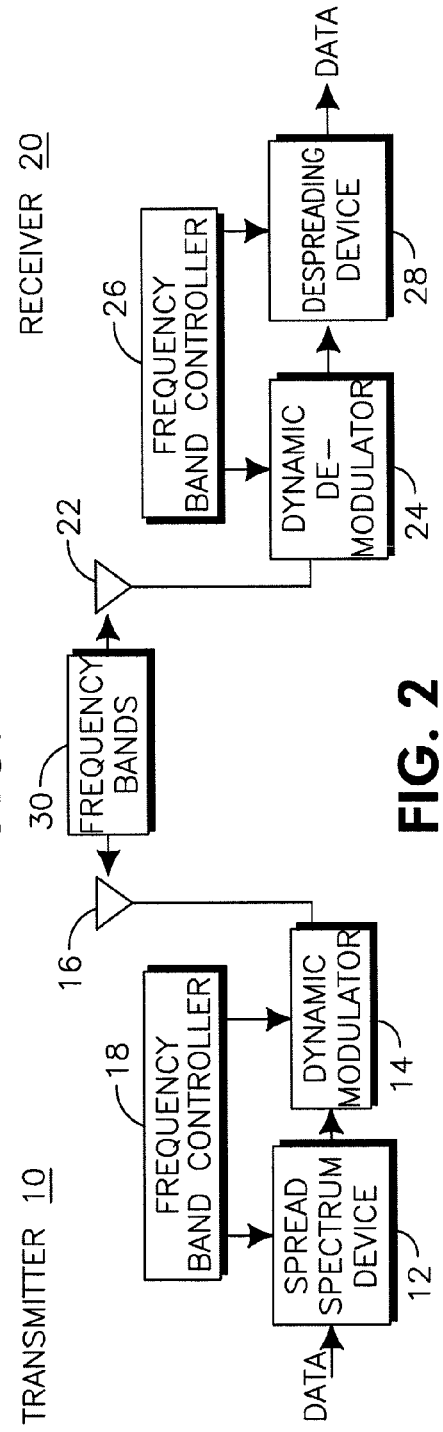

FULL DUPLEX COMMUNICATION SYSTEM USING DISJOINT SPECTRAL BLOCKS

CROSS REFERENCE TO RELATED APPLICATION(S)

This application claims priority from U.S. Provisional Application No. 60/550,492, filed on Mar. 5, 2004, which is incorporated by reference as if fully set forth herein.

FIELD OF INVENTION

This invention relates to wireless communications. More particularly, it relates to wireless communications in multiple frequency bands.

BACKGROUND

New pieces of frequency spectrum have been allocated for wireless communications. For example, a reallocation proposed by the U.S. Federal Communications Commission would allocate 27 megahertz of spectrum from the 216 220 Mhz, 1390 1395 Mhz, 1427 1429 Mhz, 1429 1432 Mhz, 1432 1435 Mhz, 1670 1675 Mhz, and 2385 2390 Mhz bands, by transfer of these bands from government use to non-government use. FIG. 1A is an illustration of the 1390 1395 Mhz, 1427 1429 Mhz, and 2385 2390 Mhz spectrum blocks. These disjoint spectral pieces are not contiguous, are small in size, and may be of unequal widths. Such noncontiguous spectral pieces are referred to herein as disjoint spectral blocks.

Accordingly, it is desirable to have more efficient approaches to utilizing disjoint spectrum blocks.

SUMMARY

The invention involves utilizing pieces of disjoint spectral blocks. In one embodiment, a frequency division duplex approach is used, where each spectral block is utilized solely for either uplink or downlink communications. In another embodiment, a time division duplex approach is used, where each spectral block is time divided and uplink and downlink communications are assigned to different time slots within the same spectral blocks. In another embodiment, a code division duplex approach is utilized, where uplink and downlink communications are assigned different codes within a same spectral block. The codes may be used to spread the signal in frequency by chopping the signal in time domain or by hopping the center frequency in a pseudo random manner within the available bandwidth. In the last embodiment, a judicious combination of these methods (Frequency, Time and Code Division Duplexing techniques) may be employed.

In order to practically realize such systems, the communicating radio devices need to be able to flexibly and efficiently reconfigure themselves into being able to transmit and receive in various spectral bands while using various techniques. As such, in a preferred embodiment, the communicating radio devices in such contexts, may be implemented in software using principles such as Software Defined Radio (SDR) or using reconfigurable hardware architectures, such as programmable array architectures and programmable parallel and streaming processors.

BRIEF DESCRIPTION OF THE DRAWINGS

FIG. 1A is an illustration of disjoint FCC proposed spectrum blocks.

FIG. 1B is an illustration of disjoint spectrum blocks showing time slots and communication assignments.

FIG. 2 is a simplified block diagram of a transmitter and a receiver for use in adaptive frequency division duplex communication.

DETAILED DESCRIPTION OF THE PREFERRED EMBODIMENTS

Figure 3:
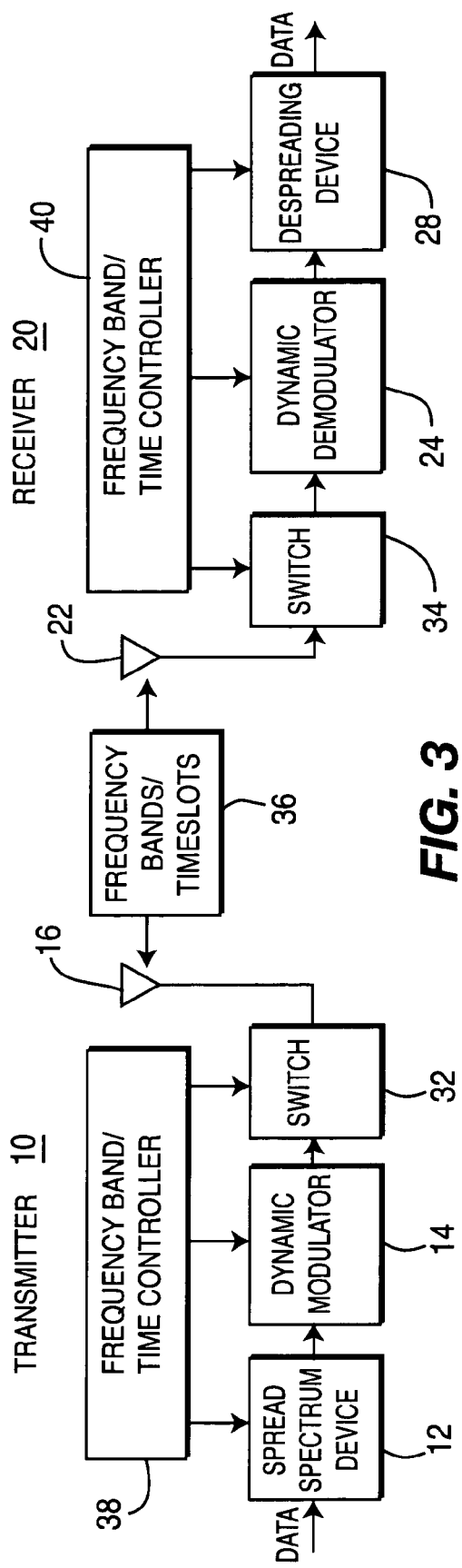
FIG. 3 is a simplified block diagram of a transmitter and a receiver for use in adaptive time division duplex communication.

As used herein, the terminology "wireless transmit/receive unit" (WTRU) includes but is not limited to a user equipment, mobile station, fixed or mobile subscriber unit, pager, STA, or any other type of device capable of operating in a wireless environment. The terminology "base station" includes but is not limited to a Node B, site controller, access point or any other type of interfacing device in a wireless environment.

DSSS, FHSS, OFDM FDD

One approach for using non-contiguous frequency bands is a frequency division duplex based approach. The available frequency bands are adaptively assigned for the uplink or the downlink. The assignment of the bands may be based on the amount of traffic and the size of the bands. Additionally, interference measurements may be used to determine whether the uplink or downlink should be assigned to a particular band. To illustrate, one band may experience severe interference in the uplink and mild interference in the downlink. This one band should preferably be used for the downlink. While the usage of a frequency band for uplink and another frequency band for downlink is known prior art, in this invention we are proposing a scheme where (1) in case only a pair of frequency bands is used for duplex communication, the widths of the uplink and downlink frequency bands need not be equal to each other, (2) in case more than two non-contiguous bands of frequencies are being used for the duplex communication, more than one non-contiguous frequency band may be used for uplink or downlink. In other words, the uplink (or downlink) data is split into and transmitted on different frequency bands. The data under consideration may be data from/to the same or different user(s), data from the same or different source (e.g. video file download).

FIG. 1B shows an example of a diagram of a method of generating a plurality of communication assignments by adaptively assigning a plurality of full duplex communications to a plurality of disjoint spectral blocks in a plurality of time slots at a wireless transmit/receive unit (WTRU).

FIG. 2 is a simplified diagram of a transmitter 10 and a receiver 20 for use in adaptive frequency division duplex communication. The transmitter 10 and receiver 20 may be located in a WTRU, base station or both. At the transmitter 10, data is received for transmission. A frequency band controller 18 determines which frequency band or bands are used for the transmissions. By adaptively assigning uplink and downlink communications to certain bands, traffic asymmetry can be handled better. To illustrate, a smaller sized frequency band could be allocated to a low traffic uplink, while a larger sized frequency band allocated to a heavy traffic downlink. A spread spectrum device 12 processes the data for transmission. If the frequency bands are of unequal spectrum, the spread spectrum device 12 produces a signal to fit in the corresponding frequency band.

To illustrate, one spread spectrum technique is direct sequence spread spectrum (DSSS). In DSSS, a chip code sequence is mixed with the data to produce a spread signal. To produce a signal of the desired spectrum size, the chipping rate or filtering coefficients can be adjusted to control the spread. Alternately, the spread signal may be filtered (bandpass, lowpass, highpass, etc.) to fit into the desired frequency band. In this case, the receiver may experience a degraded performance in synchronizing to the spreading code, due to the energy filtered and hence not transmitted to the receiver. Thus, a careful engineering tradeoff is preferably utilized in the design of this approach. At the same time, this approach provides clear advantages over the prior art, as traditional spread spectrum systems transmit the entire band of spread frequencies whereas the present invention provides a receiver with a code synchronizer that only has partial spectral information.

In another approach, the spread spectrum is fixed, such as 1.5 MHz. The number of DSSS frequencies put into a frequency band is based on the size of the band. To illustrate, a 2 MHz band may have one 1.5 MHz DSSS frequency and a 5 MHz band may have 2 or 3 1.5 MHz DSSS frequencies.

If the data is being sent over two non-contiguous bands, the spread spectrum device may spread the data multiple times at the same chipping rate (for equal sized spectrums) or at different chipping rates for different sized spectrums. Alternately, as noted above, the data may be spread over a spectrum spanning both frequency ranges and the non-assigned frequencies are notch filtered out of the resulting spread signal.

Another spread spectrum technique is frequency hopping spread spectrum (FHSS). In FHSS, the data hops over many relatively narrowband frequencies within one or multiple ones of the assigned frequency bands. The frequency hopping pattern is constrained to fit within the assigned frequency bands. To illustrate, two frequency bands may be assigned for the uplink. The frequency hop pattern may hop both frequency bands.

Preferably, slow frequency hopping modulation is used. Using slow FHSS reduces the spill energy outside of the allocated bands within which the frequencies hop (leaving some guard bands). However, faster frequency hopping may be desirable in certain implementations.

Another spread spectrum technique is orthogonal frequency division multiplex (OFDM). In OFDM, multiple overlapping but orthogonal carriers are used to carry the data. For an OFDM transmission, the number of sub-carriers can be restricted or nulled to control the spectrum used by the resulting signal. To illustrate, the OFDM transmission may be assigned to two non-contiguous, but otherwise closely spaced frequency bands. The spread OFDM signal may span both frequency bands with the carriers, nulled within the frequency band between the two assigned bands. Alternately, a different OFDM waveform may be produced for each frequency band.

The resulting spread spectrum signal is modulated to the appropriate frequency by a dynamic modulator 14 and radiated by an antenna 16 or antenna array. The dynamic modulator 14 is capable of modulating the spread spectrum signal to any of the frequency bands.

The receiver 20 receives the radiated signal using an antenna 22 or antenna array over the frequency bands 30. A dynamic demodulator 24 demodulates the received signal to an intermediate frequency. The dynamic demodulator 24 is capable of demodulating from any of the frequency bands. A despreading device 28 despreads the intermediate frequency signal to recover the transmitted data. The demodulated frequencies and the despreading device 28 are controlled by a frequency band controller 26.

Although the components of FIG. 2 are illustrated as separate components, these components may be on an integrated circuit (IC), such as an application specific integrated circuit (ASIC), multiple ICs, discrete components, or a combination of discrete components and IC(s).

DSSS OFDM TDD

Another approach for using non-continuous frequency bands for duplex communications is a time division duplex based approach. The available frequency bands are time divided, such as into time slots, and the time slots are adaptively assigned for the uplink or the downlink.

FIG. 3 is a simplified diagram of a transmitter 10 and a receiver 20 for use in adaptive time division duplex communication. The transmitter 10 and receiver 20 may be located in a WTRU, base station, or both. At the transmitter 10, data is received for transmission. A frequency band/time controller 38 determines which frequency band(s) and time slot(s) are used for the transmissions. The assigned frequency band(s)/time slot(s) are preferably adaptively assigned to be used for uplink and downlink across all the frequency bands. The time slot allocation is preferably done considering all of the frequency bands. Such an approach can lead to better management of channel assignments, such as slow dynamic channel allocation and radio resource management. The adaptation process may be based on the traffic characteristics, RF interference scenarios, and WTRU and network capabilities.

A spread spectrum device 12 processes the data for transmission. DSSS or OFDM, among other techniques may be used for the spreading. The spread signal is modulated to the appropriate frequency band(s) by a dynamic modulator 14. A switch 32 allows the communication to be radiated by the antenna 16 in the appropriate time slot(s).

The receiver 20 receives the radiated signal using an antenna 22 or antenna array over the frequency bands/time slots 36. A switch 34 effectively couples the antenna output to the remaining receiver components during the appropriate time slot(s). A dynamic demodulator 24 demodulates the received signal to an intermediate frequency. A despreading device 28 despreads the intermediate frequency signal to recover the transmitted data. The demodulated frequencies, the despreading device 28, and switch 34 are controlled by a frequency band/time controller 40.

Although the components of FIG. 3 are illustrated as separate components, these components may be on an integrated circuit (IC), such as an application specific integrated circuit (ASIC), multiple ICs, discrete components, or a combination of discrete components and ICs.

DSSS FHSS CDD

Figure 4:
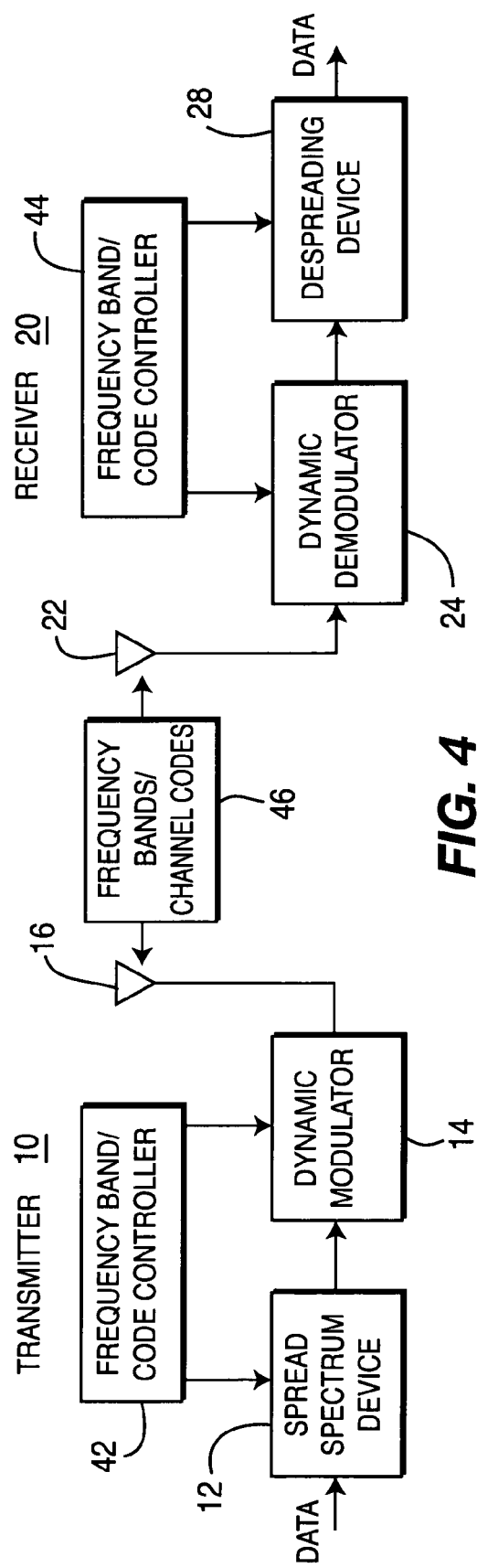
FIG. 4 is a simplified block diagram of a transmitter and a receiver for use in adaptive code division duplex communication.

FIG. 4 is a simplified diagram of a transmitter and a receiver for use in adaptive code division duplex communication. The transmitter and receiver may be located in a WTRU, base station, or both. At the transmitter, data is received for transmission. In adaptive code division duplex, uplink and downlink communications are separated by channelization codes or frequency hop patterns. The uplink and downlink communications can exist simultaneously in the same frequency band. However, the uplink and downlink are assigned different channelization codes or hop patterns to minimize interference between the uplink and downlink communications within the frequency band.

A frequency band/code controller 42 determines which frequency band(s) and code(s) are used for the transmissions. The assigned frequency band(s)/code(s) are preferably adaptively assigned to be used for uplink and downlink. The adaptation process may be based on the traffic characteristics, interference considerations, and network capabilities.

A spread spectrum device 12 processes the data for transmission. DSSS or FHSS, among other techniques may be used for the spreading. For DSSS, the assigned channel code is used in the spreading. For FHSS, the assigned code controls the hopping pattern. The spread signal is modulated to the appropriate frequency band(s) by a dynamic modulator 14 and radiated by the antenna 16 or antenna array.

The receiver 20 receives the radiated signal using an antenna 22 or antenna array over the frequency bands/channelization codes 46. A dynamic demodulator 24 demodulates the received signal to an intermediate frequency. A despreading device 28 despreads the intermediate frequency signal to recover the transmitted data. To distinguish the desired signal from other signals, the despreading device 28 uses the appropriate code for the despreading, such as a channelization code for DSSS or hop pattern for FHSS. The demodulated frequencies and the despreading device 28 are controlled by a frequency band/code controller 44.

Although the components of FIG. 4 are illustrated as separate components, these components may be on an integrated circuit (IC), such as an application specific integrated circuit (ASIC), multiple ICs, discrete components, or a combination of discrete components and ICs.

Space Division Duplex (SDD) Scheme

In yet another embodiment of the present invention, the spatial domain may also be used for utilizing non-contiguous frequency bands. Consider a MIMO (multiple input multiple output) antenna system. Here, the antennas at the transmitter and receiver are spatially separated. The present invention proposes to use different frequency bands to different antenna elements, thereby using the multiple non-contiguous frequency bands in a simple and efficient manner. This scheme is applicable for both duplex (i.e. two-way) communications as well as broadcast/multicast (i.e. one-way) communications.

Efficient Implementation of WTRUs

The WTRUs for such communication systems as disclosed in the present invention are designed to be flexible reconfigurable devices, for maximum amount of system efficiency. For example, as the frequency bands are adaptively controlled for varying functions, the WTRU will need to be adaptively reconfigured to be able to transmit and receive on varying spectral bands using varying duplexing techniques. Thus, in a preferred embodiment, a Software Defined Radio (SDR) or Reconfigurable HW/SW approach using programmable array architectures and/or programmable parallel/streaming processors is utilized.

Although the features and elements of the present invention are described in the preferred embodiments in particular combinations, each feature or element can be used alone (without the other features and elements of the preferred embodiments) or in various combinations with or without other features and elements of the present invention. Further, the present invention may be implemented in any type of wireless communication system.

What is claimed is:

1. A wireless transmit/receive unit comprising:
    at least one circuit configured to receive in a first time interval a first orthogonal frequency division multiple access (OFDM) waveform in a first frequency band over a first plurality of subcarriers and at a same time receive a second OFDM waveform in a second frequency band over a second plurality of subcarriers; wherein the first frequency band and the second frequency band are in different Federal Communication Commission (FCC) allocated spectral bands and a number of the first plurality of subcarriers differs from the second plurality of subcarriers; wherein the first and second OFDM waveform include data from a same source;
    wherein the at least one circuit is further configured to recover the same source data from the first OFDM waveform and the second OFDM waveform; and
    wherein the at least one circuit is further configured to be adaptively assigned frequency bands for reception on a time interval basis.

2. The wireless transmit/receive unit of claim 1 wherein the at least one circuit is further configured to vary a number of subcarriers utilized in the first and second frequency bands.

3. The wireless transmit/receive unit of claim 2 wherein the number of subcarriers is varied by nulling subcarriers.

4. The wireless transmit/receive unit of claim 1 wherein the first frequency band and the second frequency band are in different spectrum blocks.

5. The wireless transmit/receive unit of claim 1 wherein the different spectrum blocks are non-contiguous.

6. The wireless transmit/receive unit of claim 1 wherein the first OFDM waveform and the second OFDM waveform are received using multiple input multiple output and have different spatial domains.

7. A method comprising:
    receiving, by a wireless transmit/receive unit (WTRU), in a first time interval a first orthogonal frequency division multiple access (OFDM) waveform in a first frequency band over a first plurality of subcarriers and at a same time receiving, by the WTRU, a second OFDM waveform in a second frequency band over a second plurality of subcarriers; wherein the first frequency band and the second frequency band are in different Federal Communication Commission (FCC) allocated spectral bands and a number of the first plurality of subcarriers differs from the second plurality of subcarriers; wherein the first and second OFDM waveform include data from a same source;
    recovering, by the WTRU, the same source data from the first OFDM waveform and the second OFDM waveform; and
    receiving, by the WTRU, adaptively assigned frequency bands for reception on a time interval basis.

8. The method of claim 7 wherein the first frequency band and the second frequency band are in different spectrum blocks.

9. The method of claim 7 wherein the different spectrum blocks are non-contiguous.

10. The method of claim 7 wherein the first OFDM waveform and the second OFDM waveform are received using multiple input multiple output and have different spatial domains.

11. A base station comprising:
    at least one circuit configured to split data and transmit in a first time interval a first portion of the split data in a first orthogonal frequency division multiple access (OFDM) waveform in a first frequency band over a first plurality of subcarriers to a wireless transmit/receive unit (WTRU) and at a same time transmit a second portion of the split data in a second OFDM waveform in a second frequency band over a second plurality of subcarriers to the WTRU; wherein the first frequency band and the second frequency band are in different Federal Communication Commission (FCC) allocated spectral bands and a number of the first plurality of subcarriers differs from the second plurality of subcarriers; wherein the first and second OFDM waveform include data from a same source; and wherein the at least one circuit is further configured to adaptively assign frequency bands to transmit data to the WTRU on a time interval basis.

12. The base station of claim 11 wherein the at least one circuit is further configured to vary a number of subcarriers utilized in the first and second frequency bands.

13. The base station of claim 12 wherein the number of subcarriers is varied by nulling subcarriers.

14. The base station of claim 11 wherein the first frequency band and the second frequency band are in different spectrum blocks.

15. The base station of claim 11 wherein the different spectrum blocks are non-contiguous.

16. The base station of claim 11 wherein the first OFDM waveform and the second OFDM waveform are transmitted using multiple input multiple output and have different spatial domains.

* * * * *